United States Patent
Gretz

(10) Patent No.: US 6,734,356 B1
(45) Date of Patent: May 11, 2004

(54) PREPACKAGED MOUNTING ASSEMBLY AND BRACKET COMBINATION

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/464,334

(22) Filed: Jun. 18, 2003

Related U.S. Application Data

(63) Continuation-in-part of application No. 10/361,292, filed on Feb. 10, 2003, now Pat. No. 6,632,998, which is a continuation-in-part of application No. 10/287,088, filed on Nov. 4, 2002, now Pat. No. 6,646,201, which is a continuation-in-part of application No. 10/012,584, filed on Nov. 7, 2001, now Pat. No. 6,509,524, and a continuation-in-part of application No. 10/017,571, filed on Oct. 22, 2001, now Pat. No. 6,677,523, which is a continuation-in-part of application No. 09/784,981, filed on Feb. 16, 2001, now Pat. No. 6,355,883, which is a continuation-in-part of application No. 09/373,431, filed on Aug. 13, 1999, now Pat. No. 6,191,362.

(51) Int. Cl.$^7$ .................................................. H01H 9/02
(52) U.S. Cl. ........................... 174/58; 174/50; 174/53; 220/4.02; 248/906
(58) Field of Search ............................. 174/58, 48, 50, 174/5.3; 220/3.3, 3.9, 4.02; 248/906; 52/39

(56) References Cited

U.S. PATENT DOCUMENTS

| | | | | |
|---|---|---|---|---|
| 2,891,755 A | * | 6/1959 | Clark | 248/222.12 |
| 3,767,151 A | * | 10/1973 | Seal et al. | 248/205.1 |
| 3,770,873 A | * | 11/1973 | Brown | 174/58 |
| 3,993,212 A | * | 11/1976 | Ryan | 220/3.6 |
| 5,234,119 A | | 8/1993 | Jorgensen et al. | |
| 5,762,223 A | | 6/1998 | Kerr, Jr. | |
| 5,854,443 A | | 12/1998 | Reiker | |
| D408,906 S | | 4/1999 | Toscano et al. | |
| 6,198,045 B1 | | 3/2001 | Roesch | |
| 6,443,322 B1 | * | 9/2002 | Braun et al. | 220/4.02 |

* cited by examiner

Primary Examiner—Dhiru R Patel

(57) ABSTRACT

A prepackaged mounting assembly for securing an electrical fixture, such as a ceiling fan, light fixture, or similar device to a rafter or other suitable structure. The mounting assembly includes a junction box having a closed top, a side wall, and an open bottom that define an electrical wiring enclosure integral with the closed bottom. Provided within the junction box are integral holsters for temporary storage of threaded fasteners. A bracket is provided attached to the closed top for securing the junction box to an appropriate structural surface. An electrical fixture is secured to the junction box by removing the threaded fasteners from their respective holsters and securing them through the top of the electrical fixture, through the junction box, and into the bracket.

27 Claims, 6 Drawing Sheets

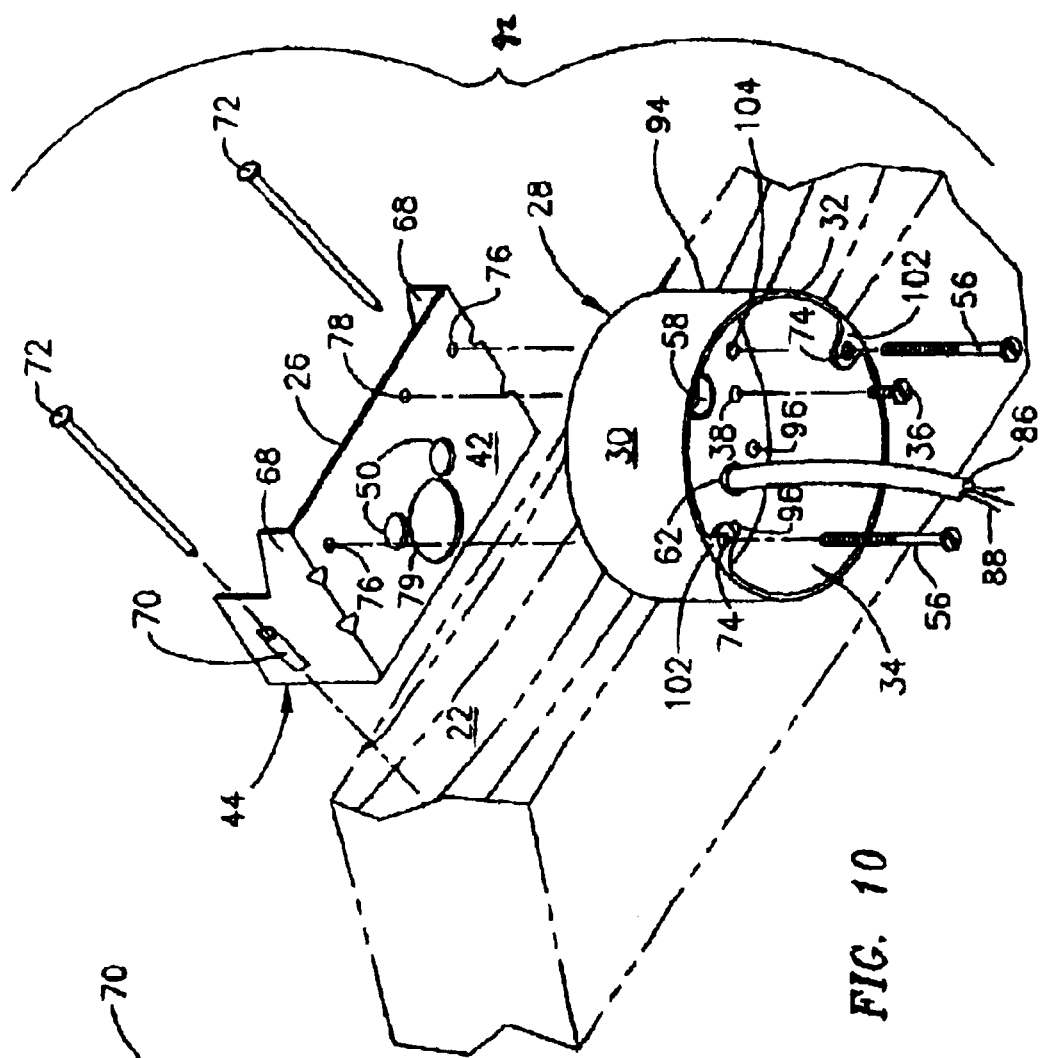
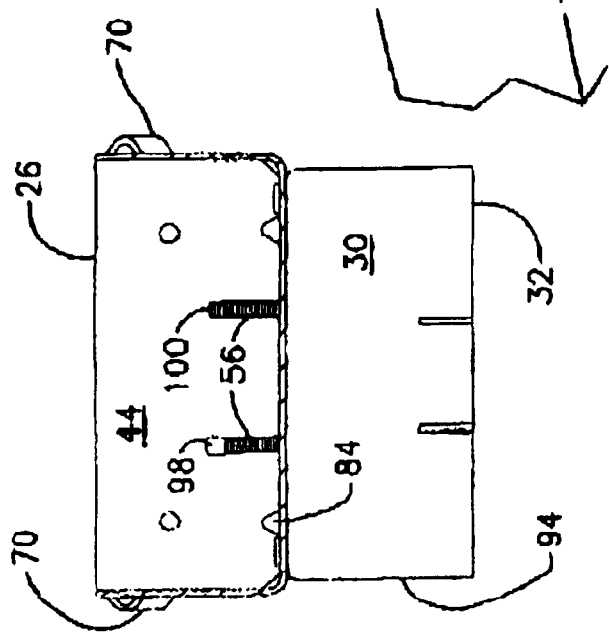
FIG. 10
FIG. 9

PREPACKAGED MOUNTING ASSEMBLY AND BRACKET COMBINATION

This application is a Continuation-in-Part of U.S. patent application Ser. No. 10/361,292 entitled "Prepackagsd Mounting Assembly with Holstered Screws", filed Feb. 10, 2003 now U.S. Pat. No. 6,632,998, which is a Continuation-In-Part of U.S. patent application Ser. No. 10/287,088 entitled "Prepackaged Mounting Assembly", filed Nov. 4, 2002 now U.S. Pat. No. 6,646,201, which is a Continuation-In-Part of U.S. patent application Ser. No. 10/012,584 entitled "Prepackaged Mounting Assembly", filed Nov. 7, 2001, now U.S. Pat. No. 6,509,524, and a Continuation-In-Part of U.S. patent application Ser. No. 10/017,571 entitled "Electrical Fixture Mounting Box and Mounting Assembly", filed Oct. 22, 2001, now U.S. Pat. No. 6,677,523, which is a Continuation-In-Part of U.S. patent application Ser. No. 09/784,981 entitled "Electrical Fixture Mounting Box and Mounting Assembly", filed Feb. 16, 2001, now U.S. Pat. No. 6,355,883, which is a Continuation-In-Part of U.S. patent application Ser. No. 09/373,431 entitled "Electrical Fixture Mounting Box", filed Aug. 13, 1999, now U.S. Pat. No. 6,191,362.

FIELD OF THE INVENTION

The present invention relates to devices and methods for mounting ceiling fans and other large and heavy electrical fixtures to ceilings. More particularly, the present invention describes a prepackaged mounting assembly for providing easy attachment of an electrical fixture to a rafter or similar building structure. The prepackaged mounting assembly comprises an electrical junction box and a bracket. Fasteners are held in temporary storage locations in the junction box. The junction box and bracket are secured to a suitable structural surface. The fasteners are removed from the temporary storage locations and moved to their permanent locations to secure an electrical fixture to the bracket. The junction box includes an integral electrical junction box for storage of wiring connections.

BACKGROUND OF THE INVENTION

In the hardware and construction industry, it has become desirable to include fasteners with each separate electrical device that is sold. Electrical mounting devices such as outlet boxes for example, are supplied by the manufacturer with fasteners attached to each separate device. This allows a hardware store to display and market a total package to the consumer and absolves the consumer of the task of locating and purchasing the required fasteners. It also eliminates the time and effort required for the consumer to locate the correct bin and obtain the correct fastener. By supplying the correct fasteners with each device, both the homeowner and professional installers are freed of the task of locating fasteners at the time of installation. Prepackaged fasteners therefore are very convenient and desirable in modem construction or remodeling projects.

One application that would benefit from prepackaged fasteners is the mounting device for supporting ceiling-mounted electrical fixtures. It is common to hang electrical fixtures such as lights and fans from ceilings. Although many mounting devices have been proposed for this task, they typically do not include prepackaged fasteners as part of the mounting device. This forces the installer to obtain the fasteners separately and have them ready at the time of installation. In addition, if the fasteners are not conveniently located with the mounting device, it becomes quite tedious for an installer to hold the mounting device overhead while inserting a fastener, thread the fastener into a support structure, and tighten the fastener therein enough to secure the device to the structure.

Several manufacturers have sought to include fasteners with the mounting device by packaging the device in a container, such as a box, and including the fasteners in a separate container within the box, such as a plastic bag. This solves the problem of obtaining the fasteners separately, but is undesirable as the packaging adds to the cost of the device and the fasteners are not held in a location convenient to the job. The installer must typically remember to remove the bag of fasteners and carry it with the device to the installation site. Furthermore, if the fasteners are lost, there is a risk that the installer will use the wrong fasteners, thereby creating an unsafe and dangerous installation.

U.S. Pat. Nos. 6,191,362 (hereinafter the '362 patent) and 6,355,883 (hereinafter the '883 patent) to Gretz, both incorporated herein by reference in their entirety, therefore proposed a mounting assembly that included extended recesses and apertures the purpose and utility of which was to provide a location for the placement of mounting bolts or screws during shipment and prior to installation. As stated in this disclosure, the inclusion of mounting bolts or screws, frictionally engaged in apertures assures the immediate availability of such fasteners at the appropriate time to the installation process. The mounting assemblies included a channel with teeth for engaging a rafter for attaching an electrical fixture thereto.

U.S. patent application Ser. No. 10/017,571, filed Oct. 22, 2001 and incorporated herein by reference in its entirety, proposed a mounting assembly with a channel for attachment to an overhead rafter. The mounting assembly included a junction box and at least one holster included with the box. The holster comprised an integral tubular projection from the box with the tubular projection open to and communicating with the interior volume at a first end joining the box and either open or closed at a second end away from the box. This disclosure therefore proposed an electrical device mounting assembly that provided prepackaged fasteners. The prepackaged fasteners are provided in temporary storage receptacles during storage and shipment of the box. At the assembly site, the fasteners are typically moved to the appropriate location for anchoring the box.

U.S. patent application Ser. No. 10/012,584, filed Nov. 7, 2001, and U.S. patent application Ser. No. 10/287,088, filed Nov. 4, 2002, both incorporated herein by reference in their entirety, provided an L-shaped mounting assembly for flush mounting on a horizontal rafter. The mounting assemblies included integral holsters as temporary storage locations for fasteners during storage and shipment. The holsters provide a temporary storage location for the fasteners, protect their ends while storing them therein, and hold the fasteners securely until they are purposely removed by the user.

U.S. patent application Ser. No. 10/361,292, filed Feb. 10, 2003 and incorporated herein by reference in its entirety, provided a mounting assembly for securing an electrical fixture to a sloped ceiling. The mounting assembly included two embodiments, one for use with a cathedral ceiling and one for use with a vaulted ceiling. The mounting assembly included an electrical enclosure and a seat for flush fitting against an appropriate brace. An initial fastening screw was included partially secured in a boss below the seat. The box was secured to a brace using the initial fastening screw, the brace secured to an overhead rafter on a sloped ceiling, and an electrical fixture installed to the mounting assembly by removing the threaded fasteners from their respective holsters and securing them through the bracket of the electrical fixture and into the brace.

Although the above referenced inventions and disclosures provide various useful mounting assemblies, they do not provide an adequate prepackaged mounting assembly for mounting against the side of a rafter in those situations in which it is desired that no portions of the mounting assembly extend beyond the bottom of the rafter, such as in the mounting assemblies including channels and L-shaped boxes. Attachment of a mounting assembly having a channel such as that described in the '362 and '883 patents also has the disadvantage of requiring that the rafter be of a size to match the size of the channel. Accordingly, it is desirable at times to have a prepackaged mounting assembly for electrical fixtures that may be mounted to the side of a rafter or other overhead structure.

The mounting assembly of the present invention will therefore provide a mounting assembly having all the required hardware for securing an electrical fixture to the side of an overhead rafter.

An advantage of the present invention is that all required mounting fasteners are included with the mounting assembly.

A further advantage is that the mounting assembly provides a means of holding the fasteners very securely until needed at the job site, so that there will be no loss or displacement of fasteners during storage or shipment.

An additional advantage is that the fasteners are held in the mounting assembly in a manner that the ends of the fasteners are protected during storage and shipment.

The present invention therefore provides a mounting assembly that does not require separate packaging enclosing it or enclosing fasteners provided separately with the assembly.

The present invention will furthermore provide a mounting assembly including an integral junction box for wiring connections.

These, and other advantages will be apparent to a person skilled in the art by reading the attached description along with reference to the attached drawings.

SUMMARY OF THE INVENTION

According to the present invention, there is provided a prepackaged mounting assembly for securing an electrical fixture, such as a ceiling fan, light fixture, or similar device to a rafter or other suitable structure. The mounting assembly includes a fixture box having a closed top, a side wall, and an open bottom that define an electrical wiring enclosure. Provided within the junction box are integral holsters for temporary storage of threaded fasteners. A bracket is provided attached to the closed top for securing the junction box to an appropriate structural surface. An electrical fixture is then installed to the junction box by removing the threaded fasteners from their respective holsters and securing them through the top of the electrical fixture and into the junction box and bracket.

DESCRIPTION OF THE DRAWINGS

FIG. 9 is a side view of a third embodiment of the prepackaged mounting assembly.

FIG. 10 is a perspective view of the embodiment of the prepackaged mounting assembly of FIG. 9 secured to a rafter and,with electrical cable and wiring fed into the integral electrical box.

TABLE OF NOMENCLATURE

Figure 1:
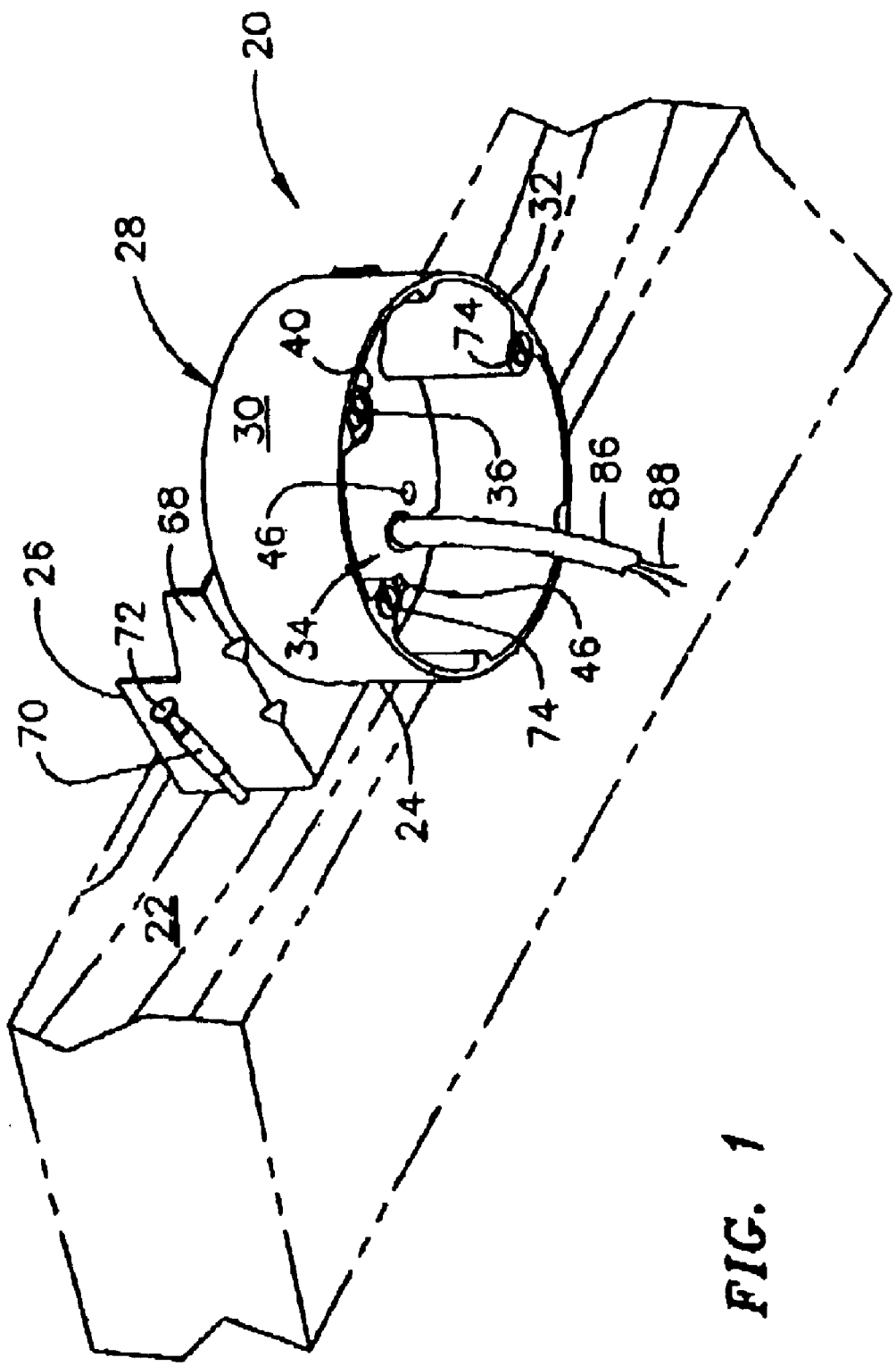
FIG. 1 is a perspective view of a preferred embodiment of a prepackaged mounting assembly and bracket secured to a rafter and with electrical cable and wiring fed into the integral electrical box.

The following is a listing of part numbers used in the drawings along with a brief description:

| Part Number | Description |
| --- | --- |
| 20 | prepackaged mounting assembly |
| 22 | structural surface |
| 24 | electrical junction box |
| 26 | angular bracket |
| 28 | top of junction box |
| 30 | peripheral side wall of junction box |
| 32 | bottom edge of side wall |
| 34 | interior volume of junction box |
| 36 | initial fastener |
| 38 | threaded boss |
| 40 | peripheral boss wall |
| 42 | horizontal face |
| 44 | vertical face |
| 46 | holster |
| 48 | integral tubular projection |
| 50 | aperture to accommodate holster |
| 52 | first end of tubular projection |
| 54 | second end of tubular projection |
| 56 | fastener |
| 58 | knockout |
| 60 | opening |
| 62 | electrical fitting |
| 64 | open periphery of knockout |
| 66 | bridge |
| 68 | brace |
| 70 | tubular fastener receptacles |
| 72 | bracket fastener |
| 74 | permanent aperture in junction box |
| 76 | permanent aperture in horizontal face |
| 78 | aperture for initial fastener |
| 79 | large aperture to accommodate electrical fitting |
| 80 | outer bore of holster |
| 82 | inner bore of holster |
| 84 | V-shaped ribs |
| 86 | electrical cable |
| 88 | wiring leads |
| 90 | second embodiment of prepackaged mounting assembly |
| 92 | third embodiment of prepackaged mounting assembly |
| 94 | junction box |
| 96 | aperture and temporary storage location |
| 98 | caps |
| 100 | threaded end of fastener |
| 102 | tab |
| 104 | aperture |

DETAILED DESCRIPTION

Referring to FIG. 1, the preferred embodiment of a prepackaged mounting assembly 20 is used to secure an electrical fixture (not shown) to a rafter, wall, or other structural surface 22. The mounting assembly 20 includes an electrical junction box 24 and an angular bracket 26. The electrical junction box 24 includes a top 28 having a downward extending peripheral side wall 30 culminating in a planar bottom edge 32. The top 28 and peripheral wall 30 define the interior volume 34 of the electrical junction box 24.

Figure 3:
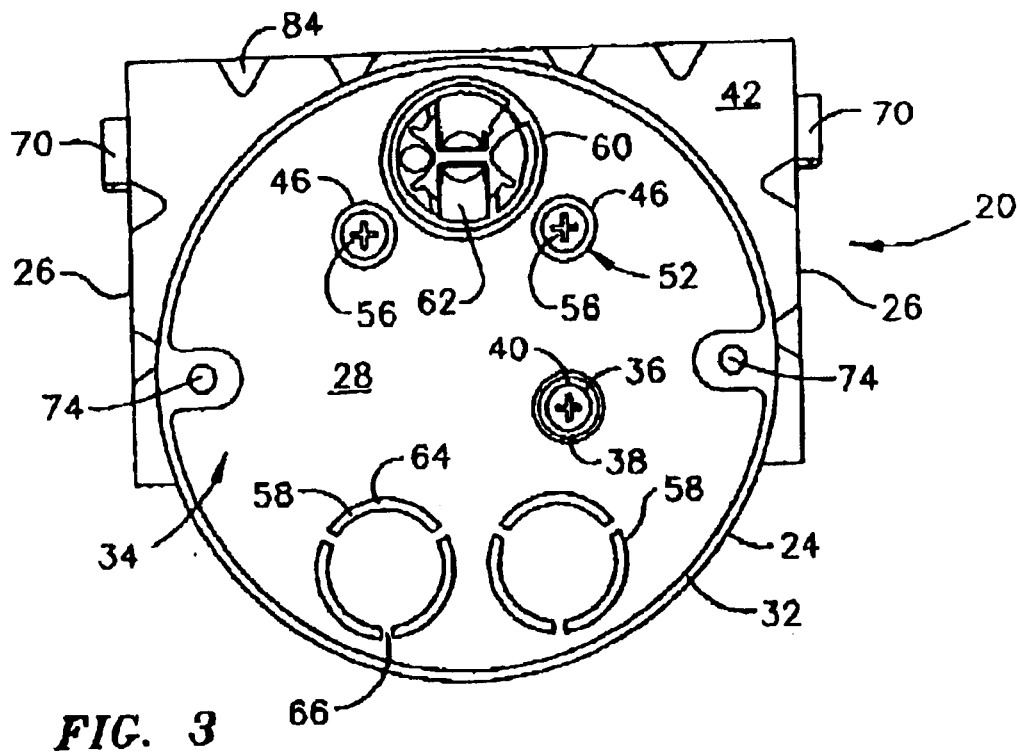
FIG. 3 is a bottom view of the prepackaged mounting assembly and bracket of FIG. 1.

With reference to FIG. 3, the mounting assembly 20 is provided with an initial fastener 36, which initially connects the electrical junction box 24 to the angular bracket 26. A threaded boss 38 is included in the top 28 of the junction box 24 to accept the initial fastener 36. The threaded boss 38 includes a peripheral boss wall 40 that extends from the bottom surface of the top 28 into the interior volume 34 of the box 24 and therefore shields the initial fastener 36 from electrical connections (not shown) that will later be completed within the junction box 24. The initial fastener 36 serves to secure the electrical junction box 24 and angular bracket 26 together conveniently as one piece during shipment, storage, and until installation at a job site.

Figure 2:
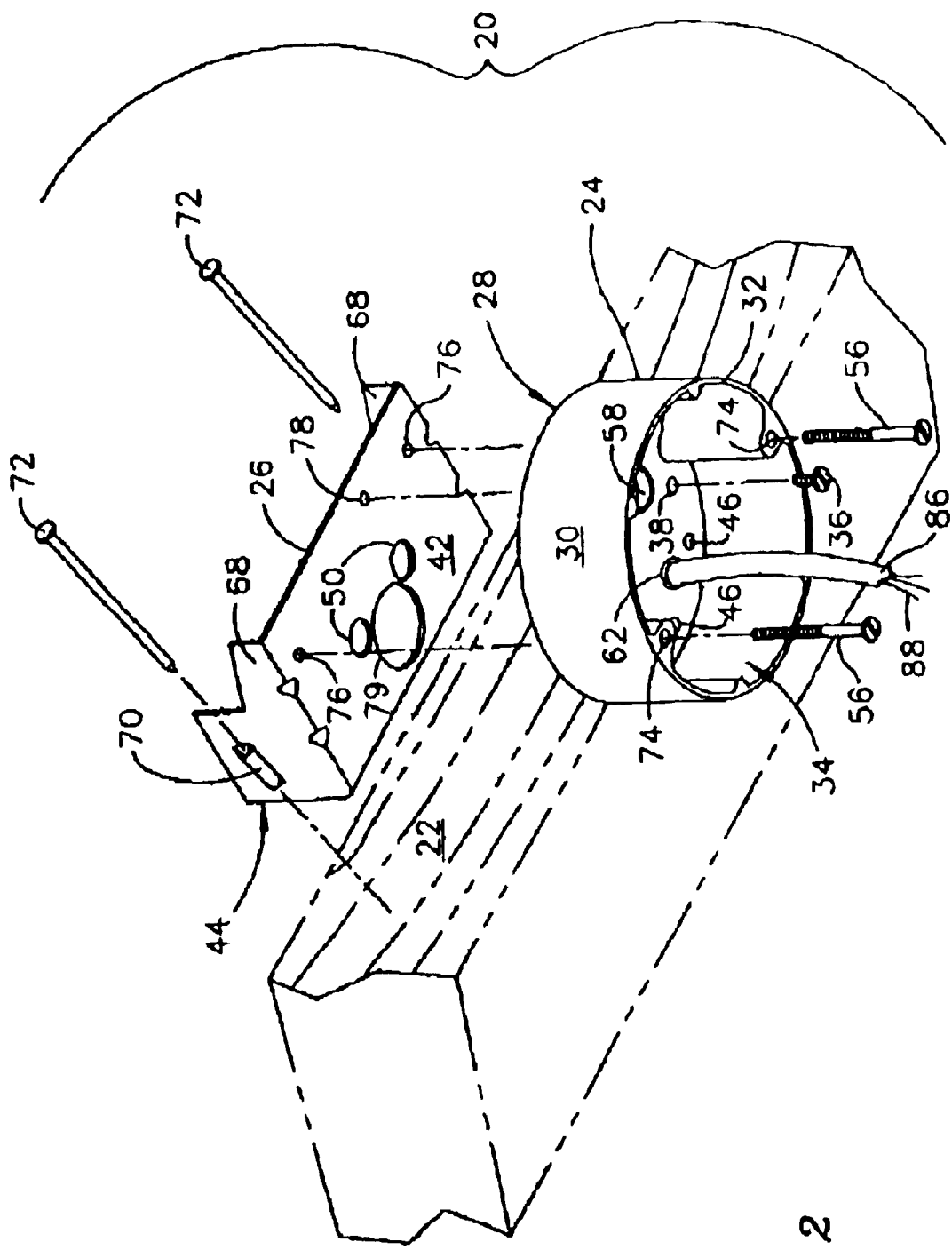
FIG. 2 is an exploded perspective view of the prepackaged mounting assembly and bracket of FIG. 1.

As shown in the exploded view of the preferred embodiment in FIG. 2, the angular bracket 26 includes a horizontal face 42 and a vertical face 44. The vertical face 44 will be placed flush against a vertical structural surface 22 and secured thereto. Situated thus, the horizontal face 42 fits flush against the top 28 of the electrical junction box 24 to which it is secured thereto by the initial fastener 36.

Figure 4:
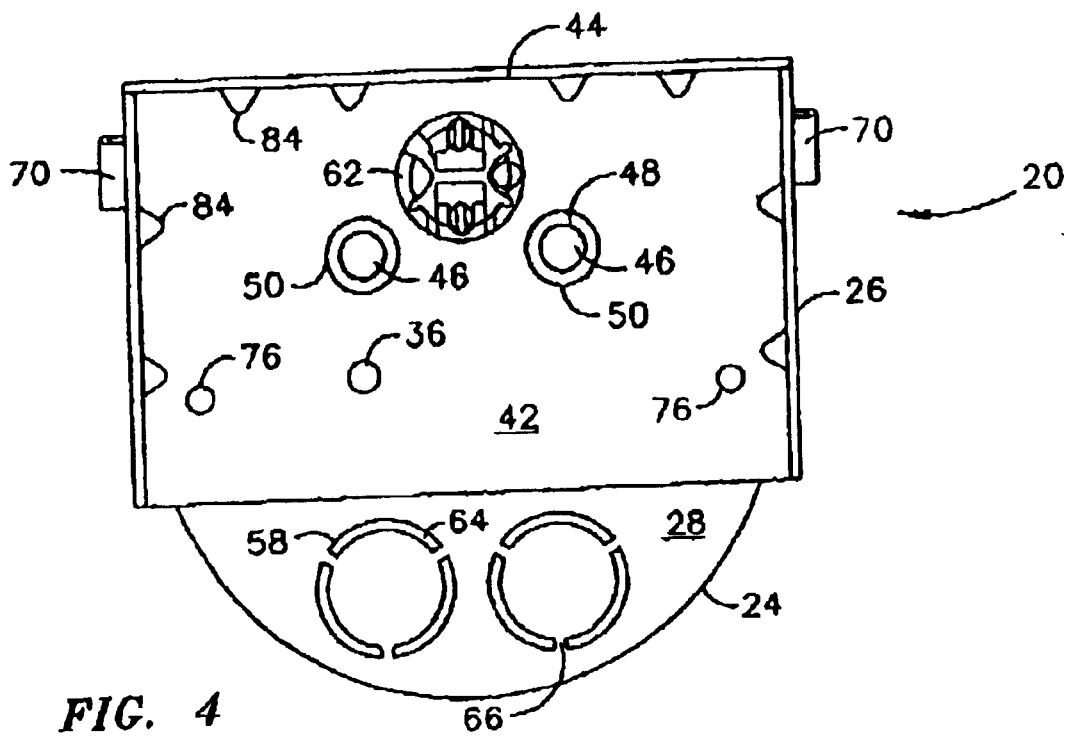
FIG. 4 is a top view of the prepackaged mounting assembly and bracket of FIG. 1.
Figure 5:
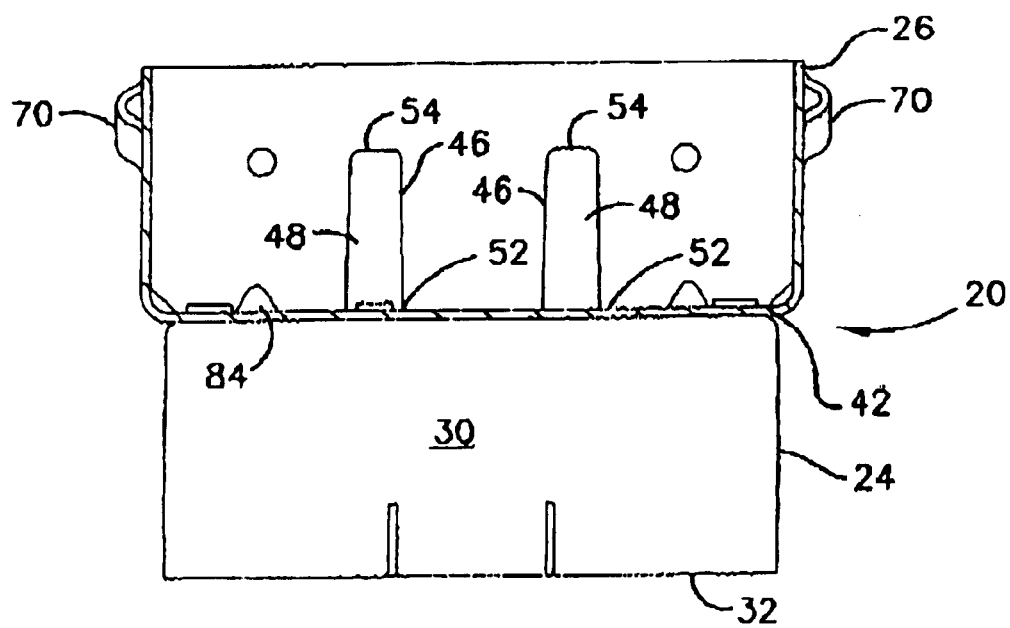
FIG. 5 is a front view of the prepackaged mounting assembly and bracket of FIG. 1.
Figure 6:
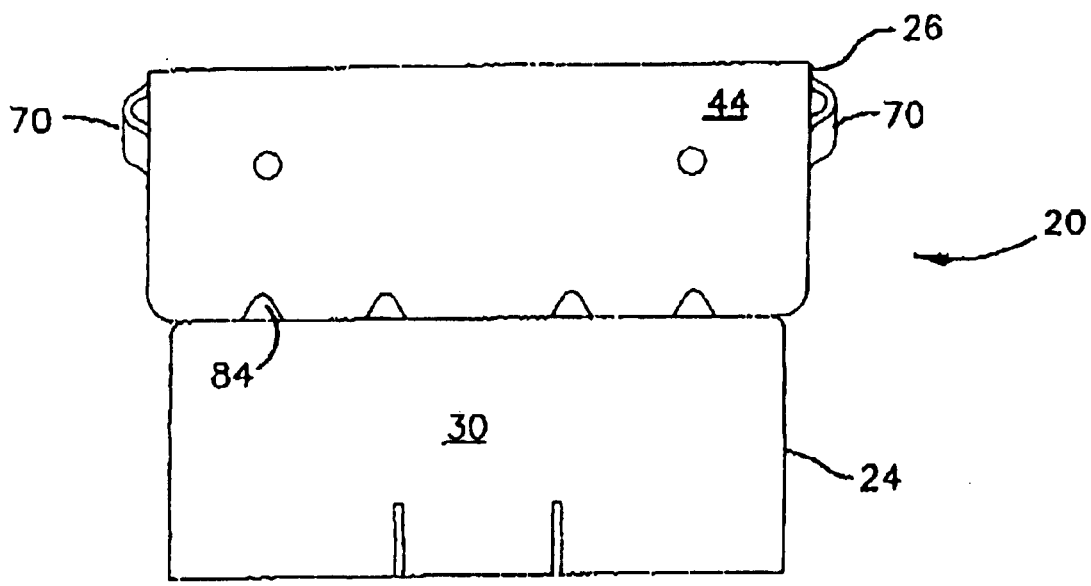
FIG. 6 is a back view of the prepackaged mounting assembly and bracket of FIG. 1.

Referring to FIGS. 3–5, the preferred embodiment of the prepackaged mounting assembly 20 includes one or more holsters 46 consisting of tubular projections 48 that are integral with the top 28 of the electrical junction box 24 and extending outwards there from. As shown in FIG. 4, apertures 50 in the horizontal face 42 of the angular bracket 26 accommodate the tubular projections 48 when the electrical junction box 24 and bracket 26 are secured together with the initial fastener 36. The integral tubular projections 48, as shown in FIG. 5, include a first end 52 at their juncture with the top 28 of the junction box 24 and a second end 54 away from the box. The holsters 46, as shown in FIG. 3, are open to and communicate with the interior volume 34 of the junction box 24 at their first end 52. A fastener 56 is frictionally engaged in each holster 46 for temporary storage with the box 24 prior to its installation at a job site. Additionally, as shown in FIGS. 3 and 4, both a knockout 58 and an opening 60 with an electrical fitting 62 are included in the top wall 28 of the junction box 24 for the later accommodation of electrical cable into the box. The knockout 58 includes a substantially open periphery 64 and one or more bridges 66 spanning the open periphery and connecting it to the top wall 28 of the junction box 24.

With reference to FIG. 2, the angular bracket 26 includes integral side braces 68 between the horizontal 42 and vertical face 44 portions. The outer surface of the braces 68 includes tubular fastener receptacles 70 that can accommodate bracket fasteners 72 as shown. At least one permanent aperture 74 is included in the top 28 of the electrical junction box 24 and at least one permanent aperture 76 is included in the horizontal face 42 of the angular bracket 26. An additional aperture 78 is provided in the horizontal face 42 and includes threads on the surrounding wall therein to accommodate the initial fastener 36. A large aperture 79 is also provided in the horizontal face 42 of angular bracket 26 to accommodate the electrical fitting 62 included on the top wall 28 of the electrical junction box 24.

Figure 7:
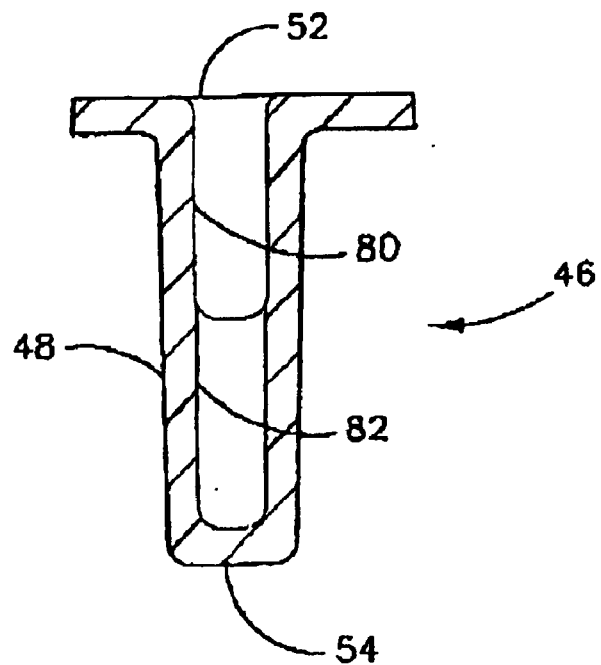
FIG. 7 is a cross sectional view of a holster according to the present invention.

FIG. 7 depicts a detailed view of a holster 46 according to the present invention. As shown in the figure, the holster 46 includes an integral tubular projection 48 having a first end 52 that is open to the interior of the junction box (not shown) and a second end 54. The tubular projection is of a length to include the entire fastener (not shown). The holster includes an outer bore 80 that is larger than the major thread diameter of the fastener it will be used in conjunction with and an inner bore 82 that is smaller than the major thread diameter of the fastener. In the preferred embodiment of the prepackaged mounting assembly, the holster 46 and its inner bore 82 is molded of plastic and a threaded fastener of the proper thread diameter can be screwed into the holster 46 where it will self-thread and be held therein by the inner bore 82. The fastener (not shown) will then be held tightly by the holster 46 during shipment and storage of the mounting assembly until the installer at the job site purposely removes the fastener.

Referring to FIG. 2, the mounting assembly 20, consisting of the electrical junction box 24 secured to the angular bracket 26 by the initial fastener 36, is operated by first positioning the mounting assembly 20 in a desired location against a structural surface 22. The mounting assembly 20 is then placed against the surface 22 in such a manner that the outer surface of the vertical face 44 of the mounting assembly 20 is flush against the structural surface 22. Bracket fasteners 72 are then driven until their heads are tight against the tubular fastener receptacles 70. At this point then the angular bracket 26 of the mounting assembly 20 is securely fastened to the structural surface 22, the electrical junction box 24 is secured to the bracket 26 by the initial fastener 36, and fasteners 56 are held in the holsters 46 for temporary storage. The fasteners 56 are then removed from the holsters 46 and an electrical fixture such as a fan, light, or combination of both is lifted so that the top support (not shown) of the electrical fixture is flush against the planar bottom edge 32 of the side wall 30. The permanent apertures 74 in the box 24 are offset from each other by an amount equal to the offset between the mounting screw holes (not shown) on the support portion of a standard electrical ceiling fixture. The permanent apertures 76 in the angular bracket 26 are offset from each other by an amount equal to the offset of the permanent apertures 74 in the box 24. The electrical fixture is then attached to the mounting assembly 20 of the present invention by placing the support portion of the electrical fixture flush against the bottom edge 32 of the side wall 30 and screwing the fasteners into the permanent apertures 74, 76. Prior to tightening the fasteners 56, electrical connections are completed between the cable 86 and the electrical fixture (not shown) and all wiring leads 88 are placed within the interior volume 34 of the junction box 24. Either the knockout 58 may be removed from the top wall 28 and house wiring fed into the box 24, or house wiring may be fed through the electrical fitting 62. The fasteners 56 are then tightened. The walls of apertures 76 are typically threaded to accept the threads on fasteners 56. Tightening of fasteners 56 into permanent apertures 74 and 76 therefore securely holds the ceiling electrical fixture (not shown) to the mounting assembly 20 of the present invention, which in turn is held securely to the structural surface 22 by bracket fasteners 72 through the tubular fastener receptacles 70.

The permanent apertures 74 in the junction box 24 extend vertically from the bottom edge 32 of the junction box 24 through the side wall 30 and to the top 28. This ensures that the long fasteners 56 used for securing a heavy ceiling fixture to the mounting assembly 20 of the present invention will not buckle or distort the junction box 24 when the ceiling fixture is secured tightly thereto.

The angular bracket 26 is typically constructed of metal. A preferred material of construction is galvanized steel. The angular bracket is typically constructed from 1/16-inch thick galvanized steel. The preferred thickness of the bracket is between 0.0425 and 0.0825 inch thick. The side braces 68 are preferably integral with the horizontal 42 and vertical 44 face portions. As shown in FIG. 2, the tubular fastener receptacles 70 are preferably located on the outer peripheries of the horizontal 42 and vertical faces 44 such that the head of a fastener inserted therein is positioned outwards of the junction box 24 and the bracket 26 and the point of the fastener 72 is oriented toward the structural surface 22. The fasteners 72 used in the tubular fastener receptacles 70 of the bracket 26 may be either screws or nails but are preferably nails. As shown in FIG. 4, the angular bracket 26 preferably includes V-shaped ribs 84 between the horizontal face 42 and the vertical face 44 and also between the horizontal face 42 and the braces 68. The V-shaped ribs 84 add structural strength to the angular bracket 26.

Figure 8:
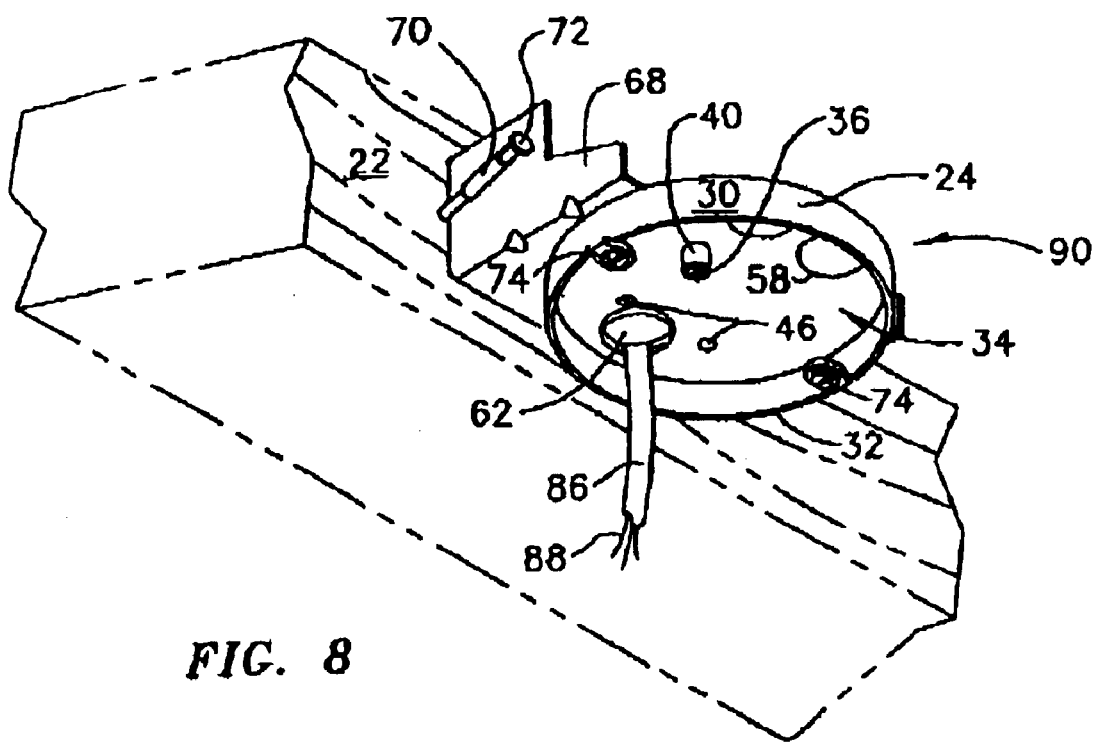
FIG. 8 is a perspective view of a second embodiment of the prepackaged mounting assembly including an electrical junction box with a short side wall and a bracket secured to a rafter and with electrical cable and wiring fed into the integral electrical box.

The electrical junction box 24 of the preferred embodiment of the mounting assembly 20 is typically molded in one piece from a suitable plastic. The preferred plastic is polyvinyl chloride or polycarbonate. Since the top cover for the support portion of a ceiling fixture is typically circular in profile, the preferred shape of the side wall 30 and junction box 24 of the present invention is circular. A circular peripheral side wall 30 would preferably have an outer diameter between 3.25 and 5.25 inches to match a standard support portion of a typical ceiling-supported electrical fixture. The vertical length of the side walls 30 could be made shorter or longer to provide an interior volume suitable to the users preference. FIG. 1 depicts a typical long wall version that would provide an interior volume 34 of approximately 22.0 cubic inches. FIG. 8 depicts a second embodiment of the prepackaged mounting assembly 90 having an electrical junction box 24 with a shorter side wall 30 thereby providing an interior volume 34 of approximately 6.4 cubic inches. The electrical junction box 24 of the mounting assembly of the present invention preferably includes an interior volume of between 5.0 and 25.0 cubic inches.

Preferably, the permanent apertures 74 in the electrical junction box 24 and the permanent apertures 76 in the angular bracket 26 are each two in number. Additional permanent apertures could be provided but would increase installation time. The offset between the mounting holes on the support portion of a standard ceiling electrical fixture is typically approximately 3.626 inches, but other offsets are sometimes encountered. The preferred offset between the permanent apertures 76 in the horizontal face 42 and between the permanent apertures 74 in the electrical junction box 24 of the present invention is therefore between 3.426 and 3.826 inches, A third embodiment of a prepackaged mounting assembly 92 according to the present invention is depicted in FIGS. 9 and 10. This embodiment includes an electrical junction box 94 that is typically constructed of metal. A fastener 56 is frictionally engaged at apertures 96 in the top wall 28 for temporary storage with the box 94 prior to its installation at a job site. The electrical junction box 94 may include caps 98 that are screwed onto the threaded ends 100 of fasteners 56 to protect them during shipment and storage. The caps 98 are typically constructed of plastic. At the job site, the caps 98 are typically discarded and the fasteners 56 removed from their temporary storage locations 96 and moved to the permanent aperture 74 in the junction box 94. In this embodiment, the permanent aperture 74 in the junction box 94 is a turned over tab 102 integral with the peripheral side wall 30 of the junction box 94. Each permanent aperture 74 is in alignment with a complementary aperture 104 in the top wall 28 of the junction box 94.

The third embodiment of the prepackaged mounting assembly 92 is shipped with an initial fastener 36 threaded through the top wall 28 of the junction box 94 and into the threaded aperture 78 in bracket 26 thereby securing the junction box 94 to the angular bracket 26. During shipment and storage of the prepackaged mounting assembly 92 the fasteners 56 are threaded into their temporary storage apertures 96. The prepackaged mounting assembly 92 is then secured to a building structure 22 by driving bracket fasteners 72 through the tubular receptacles 70. With the bracket 26 attached securely to the building structure 22, and the junction box 94 secured to the bracket 26 by the initial fastener 36, fasteners 56 may be removed from their temporary storage apertures 96 and inserted through the support ring (not shown) of an electrical fixture, through the permanent apertures 74, 104 in the junction box 94 and into the threaded apertures 76 in the horizontal face 42 of the bracket 26. Initial attachment of the junction box 94 to the bracket 26 by the initial fastener 36 frees the installer's hands thereby allowing him to support the electrical fixture (not shown) while securing it to the electrical box 94.

As the invention has been described, it will be apparent to those skilled in the art that the same maybe varied in many ways without departing from the spirit and scope of the invention. Any and all such modifications are intended to be included within the scope of the appended claims.

What is claimed is:

1. A mounting assembly comprising:
   an electrical junction box including a top and a downward extending peripheral side wall having a bottom edge and defining an interior volume;
   at least one holster in said box;
   a fastener frictionally engaged in said holster for temporary storage with said box prior to installation;
   said holster including an integral tubular projection from said top, said tubular projection open to and communicating with said interior volume at a first end joining said top and a second end away from said box, said fastener substantially enclosed by said tubular projection and said side wall when said fastener is inserted therein;
   an angular bracket having a horizontal face and a vertical face;
   at least one aperture in said box;
   at least one threaded aperture in said horizontal face;
   said aperture in said box in alignment with said threaded aperture in said horizontal face; and
   said box connected to said horizontal face of said bracket wherein said vertical face of said bracket may be secured to a structural surface thereby positioning said bottom edge of said side wall in a horizontal plane and allowing said fastener to be removed from said holster and moved to said apertures.

2. The mounting assembly of claim 1 wherein said box is connected to said bracket by an initial fastener.

3. The mounting assembly of claim 2 wherein said initial fastener is held in a threaded boss in said top of said box, said threaded boss extending into said interior volume of said box.

4. The mounting assembly of claim 3 wherein said threaded boss extending into said interior volume includes a peripheral boss wall.

5. The mounting assembly of claim 4 wherein said peripheral boss wall extends farther into said interior volume than said initial fastener.

6. The mounting assembly of claim 1 including one or more knockouts formed in said top of said box.

7. The mounting assembly of claim 6 wherein said knockouts are defined by a substantially open periphery and one or more bridges between said knockout and said top.

8. The mounting assembly of claim 1 wherein said aperture in said box extends vertically from said bottom edge of said side wall through said top.

9. The mounting assembly of claim 1 wherein said angular bracket is constructed of galvanized steel.

10. The mounting assembly of claim 9 wherein said angular bracket is between 0.0425 and 0.0825 inch thick.

11. The mounting assembly of claim 1 wherein said box is molded in one-piece from plastic.

12. The mounting assembly of claim 11 wherein said plastic is polyvinyl chloride or polycarbonate.

13. The mounting assembly of claim 1 wherein said bracket includes integral side braces between said horizontal and vertical faces.

14. The mounting assembly of claim 13 wherein said braces include tubular fastener receptacles.

15. The mounting assembly of claim 14 wherein said tubular fastener receptacles are located on the outer peripheries of said horizontal and vertical faces such that the head of a bracket fastener inserted therein is positioned outwards of said box.

16. The mounting assembly of claim 15 wherein said bracket fasteners in said fastener receptacles are nails.

17. The mounting assembly of claim 1 further including integral V-shaped rib areas between said horizontal face and said vertical face.

18. The mounting assembly of claim 1 wherein said bottom edge of said peripheral side wall is circular.

19. The mounting assembly of claim 18 wherein said circular peripheral side wall includes an outer diameter between 3.25 and 5.25 inches.

20. The mounting assembly of claim 19 wherein said interior volume is between 5.0 and 25.0 cubic inches.

21. The mounting assembly of claim 1 wherein said at least one apertures in said box and said at least one threaded apertures in said horizontal face are each two in number.

22. The mounting assembly of claim 21 wherein said two apertures in said box are offset from each other by an amount equal to the offset between said two threaded apertures in said horizontal face.

23. The mounting assembly of claim 22 wherein said offset is equal to the standard offset of mounting screw holes on a standard electrical ceiling fixture.

24. The mounting assembly of claim 23 wherein said offset is between 3.426 and 3.826 inches.

25. A mounting assembly comprising:

an electrical junction box including a top and a downward extending peripheral side wall having a bottom edge and defining an interior volume;

an angular bracket having a horizontal face and a vertical face;

at least one threaded aperture in said horizontal face;

at least one aperture in said box;

a threaded fastener passing through said aperture and engaged in said threaded aperture for temporary storage with said box prior to installation;

said fastener substantially enclosed by said side wall and said bracket;

said aperture in said box in alignment with said threaded aperture in said horizontal face; and said box connected to said horizontal face of said angular bracket wherein said vertical face of said bracket may be secured to a structural surface thereby positioning said bottom edge of said side wall in a horizontal plane and allowing said fastener to be removed from said threaded aperture and permanently placed back into said threaded apertured.

26. The mounting assembly of claim 25 wherein said box is constructed of metal.

27. The mounting assembly of claim 26 wherein said metal is galvanized steel.

* * * * *